(12) United States Patent
Chern

(10) Patent No.: US 11,415,820 B2
(45) Date of Patent: Aug. 16, 2022

(54) WAVEGUIDE STRUCTURE

(71) Applicant: Taiwan Semiconductor Manufacturing Company, Ltd., Hsinchu (TW)

(72) Inventor: Chan-Hong Chern, Palo Alto (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 44 days.

(21) Appl. No.: 16/865,586

(22) Filed: May 4, 2020

(65) Prior Publication Data

US 2021/0341766 A1    Nov. 4, 2021

(51) Int. Cl.
| | |
|---|---|
| *G02F 1/025* | (2006.01) |
| *G02B 6/12* | (2006.01) |
| *G02F 1/225* | (2006.01) |
| *G02F 1/21* | (2006.01) |

(52) U.S. Cl.
CPC .............. *G02F 1/025* (2013.01); *G02B 6/12* (2013.01); *G02F 1/225* (2013.01); *G02B 2006/12097* (2013.01); *G02B 2006/12142* (2013.01); *G02F 1/212* (2021.01); *G02F 2201/063* (2013.01); *G02F 2203/50* (2013.01)

(58) Field of Classification Search
CPC .......... G02F 1/025; G02F 1/212; G02F 1/225; G02F 2201/063; G02F 2203/50; G02B 6/12; G02B 2006/12097; G02B 2006/12142
USPC ....................................................... 385/1–3
See application file for complete search history.

(56) References Cited

U.S. PATENT DOCUMENTS

| | | |
|---|---|---|
| 7,116,853 B2 | 10/2006 | Gunn, III et al. |
| 9,448,425 B2 | 9/2016 | Ogawa et al. |
| 9,564,588 B2 | 2/2017 | Jeong et al. |

(Continued)

FOREIGN PATENT DOCUMENTS

| | | |
|---|---|---|
| EP | 2 768 072 A1 | 8/2014 |
| EP | 1 779 161 B1 | 3/2018 |

(Continued)

OTHER PUBLICATIONS

German Office Action, dated Oct. 16, 2020, seven pages. (The claims were rejected over References D1 and D2 (listed above).).

*Primary Examiner* — Robert Tavlykaev
(74) *Attorney, Agent, or Firm* — Merchant & Gould P.C.

(57) ABSTRACT

An optical phase-shifting device includes a ribbed waveguide portion on an insulating layer, the waveguide portion having a p-n or p-i-n junction extending in a longitudinal direction and having a height. A pair of slab portions are disposed adjacent the waveguide portion, one on each side of the ribbed waveguide portion and on the insulation layer. The slab portion have higher doping concentrations than the respective doping concentrations in the ribbed waveguide portion. At least a portion of each slab portion has a height increasing with distance from the waveguide portion, with the slab height being smaller than that of the waveguide portion at the junction between the waveguide portion and slab portion. A pair of contact portions are formed adjacent the respective slab portion and further away from the waveguide portion. A portion of each contact portion can also have a height varying with distance from the waveguide portion.

20 Claims, 17 Drawing Sheets

(56) References Cited

U.S. PATENT DOCUMENTS

| | | | |
|---|---|---|---|
| 10,025,120 B2 | 7/2018 | Ayazi et al. | |
| 2002/0094598 A1* | 7/2002 | Kobayashi | G02B 6/125 |
| | | | 438/57 |
| 2010/0099242 A1* | 4/2010 | Fedeli | G02B 6/136 |
| | | | 438/513 |
| 2015/0212386 A1* | 7/2015 | Patel | G02B 6/132 |
| | | | 385/3 |
| 2017/0336696 A1* | 11/2017 | Tsuzuki | G02F 1/2257 |
| 2019/0386453 A1 | 12/2019 | Schmid et al. | |
| 2020/0124883 A1* | 4/2020 | Delisle-Simard | G02F 1/025 |
| 2021/0318588 A1* | 10/2021 | Wakabayashi | G02F 1/225 |

FOREIGN PATENT DOCUMENTS

| | | |
|---|---|---|
| JP | 2014-126728 A | 7/2014 |
| JP | 2017-509022 A | 3/2017 |
| KR | 10-2015-0057486 A | 5/2015 |
| WO | 2015/155900 A1 | 10/2015 |

* cited by examiner

WAVEGUIDE STRUCTURE

BACKGROUND

In some photonic integrated circuits, waveguides are formed in the form of a rib or a channel structure. Silicon waveguides with sub-micron dimensions can confine infrared light, such as is used in data or telecommunications. Waveguides having portions of p-type and n-type doping that form a p-n or a p-i-n junction can function as a phase shifting portion. Applying an electrical field to the p-n, or p-i-n, junction can form depletion and accumulation/injection regions. The optical refractive index of such a phase shifting portion varies depending on carrier concentration, e.g. depletion or accumulation, inducing a phase shift to the light propagating in the waveguide through the phase shifting portion. Such a phase shifter can be employed to modulate the light transmission via constructive and destructive interference of phase-shifted light.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
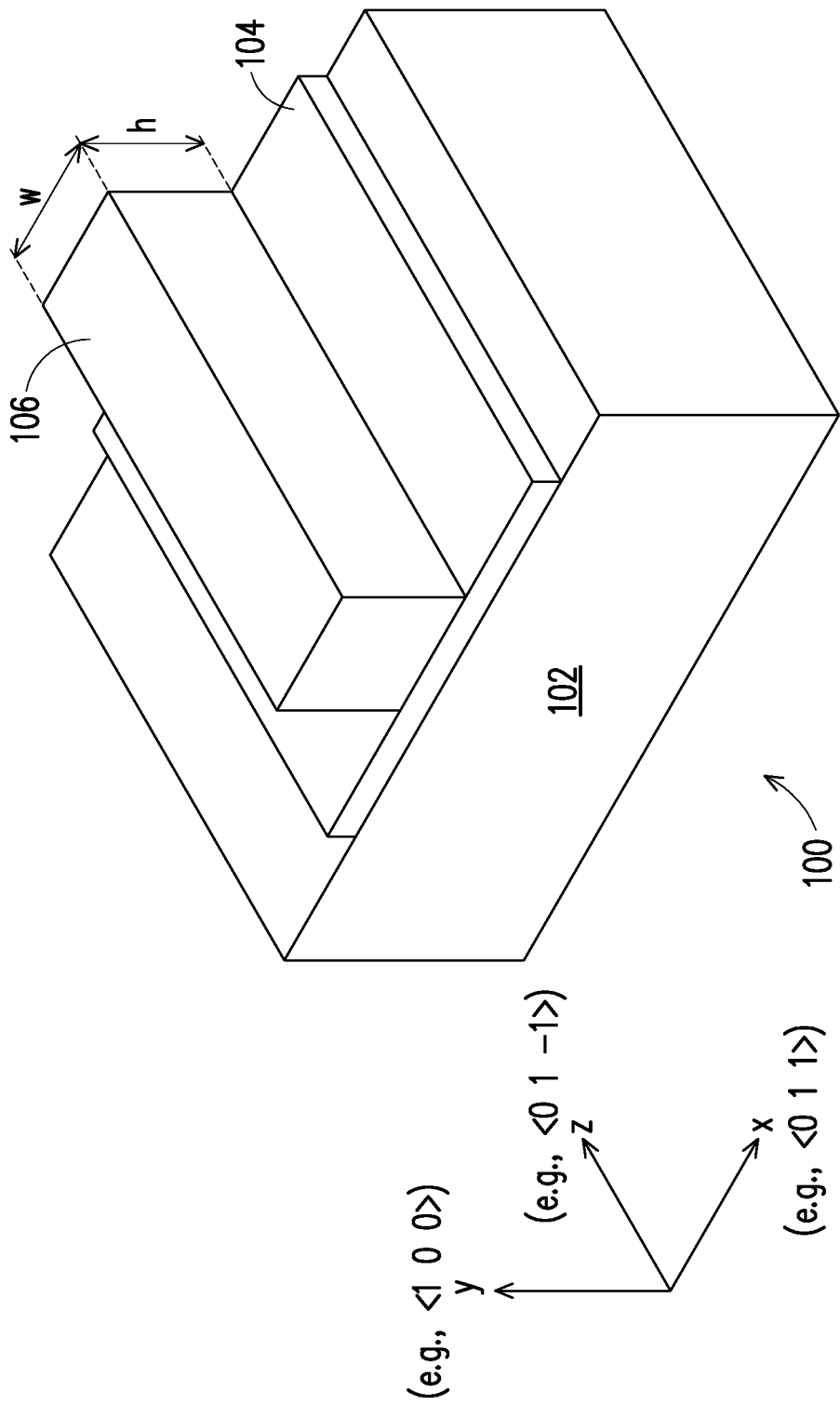
FIG. 1 is a perspective view of a waveguide structure of a photonic integrated circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some photonic integrated circuits, waveguides are formed in the form of a rib or a channel structure. Silicon waveguides with sub-micron dimensions can confine infrared light, e.g. light having wavelengths greater than around 700 nm, due to a strong optical refractive index contrast between the core material, e.g. silicon around n=3.47, and the cladding layers, e.g. silicon dioxide around n=1.45. Silicon waveguides can be used for data communications ($\lambda \sim 1310$ nm) and telecommunications ($\lambda \sim 1550$ nm). Silicon waveguides can have sub-micron dimensions, for example, around 200-300 nm in height and around 370-470 nm in width for single-mode light transmission.

Waveguides having portions of p-type and n-type doping that form a p-n or a p-i-n junction can function as a phase shifter. Applying an electrical field to the p-n, or p-i-n, junction can form depletion and accumulation/injection regions. Carrier depletion or injection can form when a silicon waveguide p-n, or p-i-n, junction becomes depleted or accumulated. The optical refractive index of such a phase shifting portion of a waveguide varies depending on carrier concentration, e.g. depletion or accumulation, inducing a phase shift to the light propagating in the waveguide through the phase shifting portion. Such a phase shifter can be employed to modulate the light transmission via constructive and destructive interference of phase-shifted light.

A p-n or p-i-n junction waveguide described above can be a ribbed structure formed on an insulating substrate and extending in the nominal direction of guided light. The ribbed structure can be formed between a pair of channels formed (e.g., etched) in a semiconductor layer (e.g., silicon) above an insulating layer. The channels are separated from each other in the direction nominally perpendicular to their length, e.g., perpendicular to the nominal direction of propagation of light within the waveguide, or the "cross-sectional" direction. The ribbed structure has a certain height, or thickness, from the insulating layer, such as a buried insulator, which is in certain examples a buried oxide layer, sometimes referred to as a BOX layer. The semiconductor regions underneath the channels are sometimes referred to as "slabs" and have a height, or thickness, above the insulating layer; the thickness is sometimes referred to as the slab thickness, which is in certain cases less than the thickness of the rib portion. Outside of the channels in the cross-sectional direction, the semiconductor height, or thickness, can be the same as that of the rib. In some examples, portions of the semiconductor material of the phase shifter outside the channels in the cross-sectional direction are heavily doped, one side p-type, the other side n-type. The slab portions of the channels are doped at a reduced concentration, or a medium-concentration; n-type for the channel adjacent the heavily n-type doped portion, and p-type for the channel adjacent the heavily p-type doped portion. Typically, half of the rib adjacent the n-type doped channel in the cross-sectional direction is n-type doped at a further still reduced concentration, or a low doping level or concentration. The other half of the rib in the cross-sectional direction is p-type doped at a low doping concentration, and the rib forms the p-n junction. In some cases, less than half of the rib is n-type doped, and less than half of the rib is p-type doped, but both are adjacent the channel, forming an intrinsic, e.g., undoped, portion of the rib between the low-doped n-type and p-type portions in the cross-sectional direction, forming a p-i-n junction.

In designing and making semiconductor waveguides, one often must balance, or manage a tradeoff, between certain the performance parameters. For example, to achieve significant, or acceptable, light confinement having low light transmission loss in a waveguide with a smaller bending radius, the slab portions of the waveguide channels should be sufficiently thin. At the same time, the resistance of the p-n, or p-i-n, junction of a phase shifting portion of a waveguide increases as the thickness decreases, limiting the speed of phase shifter. The thickness of the slabs is therefore an aspect of waveguide design to increase the phase shifter speed while minimizing transmission loss (and reduce bending radius and consequently device size).

In some embodiments, the phase shifting device, or phase shifter, includes a substrate, an insulation layer above the substrate, and a semiconductor waveguide layer above the insulating layer. The substrate in some examples is a semiconductor substrates, such as a silicon substrate. The insulating layer in some examples is a layer of oxide of the semiconductor; examples include a layer of oxide of silicon, such as a buried oxide (BOX) layer. The semiconductor waveguide layer in some examples includes a p-n or p-i-n junction portion (collectively, "waveguide portion") in which light is confined. The wave guide portion can be a ribbed structure extending in a longitudinal direction and having a width and height, with a p-n or p-i-n junction formed across the width of the ribbed structure.

The semiconductor waveguide layer in some examples further includes slab portions, one adjacent each side of the waveguide portion, with a channel formed between each side of the waveguide portion and the corresponding adjacent slab portion. Each slab portion has a thickness from the top of the BOX layer to the surface of the slab portion, and the thickness varies with the distance from the waveguide portion. Put in another way, the depth of each channel varies with the distance from the waveguide portion. In some embodiments, the thickness of each slab portion increases monotonically with the distance from the waveguide portion, and the depth of the channel decreases monotonically with the distance from the waveguide portion. In some embodiments, the thickness of each slab portion increases linearly with the distance from the waveguide portion, and the depth of the channel decreases linearly with the distance from the waveguide portion. The variation of the thickness (or depth) can take other forms, such as stepwise variation in thickness. The maximum thickness of each slab portion can be smaller than the height of the waveguide portion in some embodiments.

In some embodiments, contact portions are disposed adjacent respective slab portions, each contact portion being on the opposite side of the respective slab portion from the waveguide portion. Each contact portion can have a thickness that varies with the distance from the waveguide portion. In some embodiments, the thickness of each contact portion increases monotonically with the distance from the waveguide portion. In some embodiments, the thickness of each contact portion increases linearly with the distance from the waveguide portion. The variation of the thickness can take other forms, such as stepwise variation in thickness. The maximum thickness of each contact portion can be substantially the same as the height of the waveguide portion in some embodiments.

The waveguide portion includes, sequentially in the direction of the width of the waveguide portion, or direction of the channel separation, a first doped semiconductor portion, such as a p-doped semiconductor portion, and a second doped semiconductor portion, such as an n-doped semiconductor portion, thereby forming a p-n junction. In certain other embodiments, the waveguide portion includes, sequentially in the direction of the width of the waveguide portion, a first doped semiconductor portion, such as a p-doped semiconductor portion, an un-doped semiconductor portion, and a second doped semiconductor portion, such as an n-doped semiconductor portion, thereby forming a p-i-n junction.

In some embodiments, regardless whether the waveguide structure includes a p-n junction or p-i-n junction, the slab portion and contact portion on each side of the waveguide portion are doped semiconductor portions with the same doping type (p-type or n-type) as the doped semiconductor portion in the waveguide portion adjacent the slab portion. On each side of the waveguide structure, the contact portion can have a higher doping level than the doped semiconductor portion in the waveguide structure, and the slab portion can have a doping level intermediate those of the contact portion and doped semiconductor portion.

In some embodiments, a method for making an optical device includes the steps of: (a) forming a pair of substantially parallel channels in a semiconductor layer substrate having a surface and a thickness above an insulation layer, the pair of channels extending substantially along a longitudinal direction parallel to the surface of the semiconductor layer and being separated in a channel separation direction substantially perpendicular to the longitudinal direction by a ribbed portion having a width in the channel separation direction, each of the pair of channels having a varying depth along the channel separation direction, each of the pair of the channels separating the ribbed portion from a semiconductor portion adjacent the channel; (b) forming a p-n or p-i-n junction across the ribbed portion in the channel separation direction, the p-n or p-i-n junction having a p-doped portion having a first p-type dopant concentration and an n-doped portion having a first n-type dopant concentration; forming in at least a portion of the semiconductor layer under the channel adjacent the p-doped portion of the ribbed portion a p-doped slab portion having a higher p-dopant concentration than in the ribbed portion, and in at least a portion of the semiconductor layer under the channel adjacent the n-doped portion of the ribbed portion an n-doped slab portion having a higher n-dopant concentration than in the ribbed portion; and (c) forming a p-doped contact portion adjacent the p-doped slab portion and having a higher p-dopant concentration than the p-doped slab portion, and an n-doped contact portion adjacent the n-doped slab portion and having a higher n-dopant concentration than the n-doped slab portion.

Turning to more specific examples in this disclosure, a waveguide structure (100) according to one aspect of the disclosure, as shown in FIG. 1, includes a substrate layer (102), and insulation layer (104) disposed on top of the substrate layer (102), and a waveguide portion (106), in which guided light is substantially confined, disposed on top of the insulation layer (104). The waveguide portion (106) in this example extends nominally in a longitudinal direction, z, and has nominal cross-sectional height, h, in a direction, y, substantially perpendicular to the longitudinal direction and the insulation layer (104), and a nominal cross-sectional width, w, in a direction, x, substantially perpendicular to both y and z. The waveguide structure (100) further includes slab portions of varying thickness and contact portions (not shown in FIG. 1, but shown in more detail in FIGS. 2 and 3, as discussed below) on both sides of the waveguide portion (106).

All parts described above of the waveguide structure (100) in some embodiments are made from a single piece of semiconductor, such as single-crystal silicon, or more specifically, a single-crystal wafer. In one example, the crystal lattice is oriented such that the longitudinal direction, z, is nominally in the <0 1 −1> direction for silicon, the plane the insulating layer (104) lies in is nominally oriented in the <1 0 0> direction (y), and direction, x, along the width of the ribbed portion (106) is nominally the <0 1 1> direction. The insulation layer (104) in this example is a BOX layer, form by, for example, oxygen ion implantation technique. The waveguide portion (106) in this example is formed by etching a pair of channels into the silicon wafer surface. The silicon separating the cannels becomes the ribbed structure, which, after proper doping, becomes the waveguide portion (106). At least a portion of the silicon under the each channel becomes a slab portion after proper doping. And at least a portion of the silicon separated from the waveguide portion (106) by each slab portion becomes a contact portion after proper doping.

Figure 2:
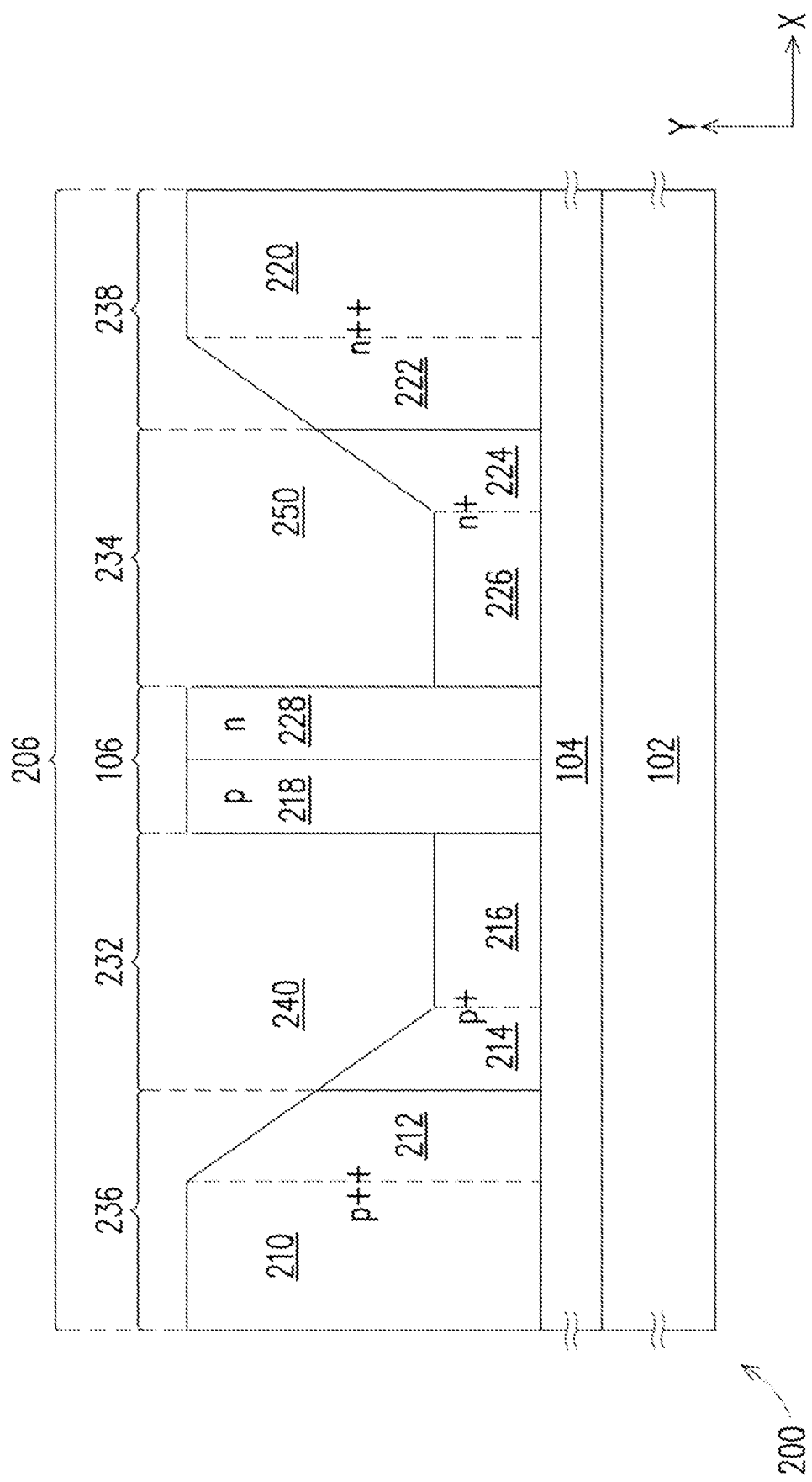
FIG. 2 is a cross-sectional view of a waveguide structure, in accordance with some embodiments.

With further reference to FIG. 2, which is cross-sectional view of a waveguide structure (200), which is substantially the same as the waveguide structure (100) illustrated in FIG. 1, but FIG. 2 includes more detailed illustration of the components. In this example, the waveguide portion (106) is a part of a semiconductor waveguide layer (206) disposed on top of the insulation layer (104) and includes a p-doped portion (218) and an n-doped portion (228), forming a p-n junction at the interface between the two portions, which is substantially lies in a y-z plane. The insulation layer (104) in this specific example is a BOX layer but can be any suitable insulation layer. The substrate layer (102) in this example is silicon but can be any suitable supporting structure for the insulation layer (104). The p-doped portion has a p-dopant concentration; the n-doped portion has an n-dopant concentration.

A p-side channel (240) is defined (e.g., by etching) adjacent the p-doped side of the waveguide portion (106); an n-side channel (250) is defined (e.g., by etching) adjacent the n-doped portion of the waveguide portion (106). A p-side slab (232) is formed by the silicon under the p-side channel (240) and is p-doped and has a higher concentration of a p-dopant than the p-doped portion of the waveguide portion (106). For example, the p-side slab (232) can be $p^+$-doped (i.e., with a medium-high p-dopant concentration). An n-side slab (234) is formed by the silicon under the n-side channel (250) and is n-doped and has a higher concentration of an n-dopant than the n-doped portion of the waveguide portion (106). For example, the n-side slab (234) can be $n^+$-doped (i.e., with a medium-high n-dopant concentration).

A p-side contact portion (236) is formed by the silicon adjacent the p-side slab (232) on the opposite side of it from the waveguide portion (106). The p-side contact portion (236) is p-doped and has a higher concentration of a p-dopant than the p-side slab (232). For example, the p-side contact portion (236) can be $p^{++}$-doped (i.e., with a heavy p-dopant concentration). An n-side contact portion (238) is formed by the silicon adjacent the n-side slab (234) on the opposite side of it from the waveguide portion (106). The n-side contact portion (238) is n-doped and has a higher concentration of an n-dopant than the n-side slab (234). For example, the n-side contact portion (238) can be $n^{++}$-doped (i.e., with a heavy n-dopant concentration).

Each of the slab portions (232, 234) has varying thickness above the insulation layer (104), i.e., in the y direction. In the embodiment shown in FIG. 2, the p-side slab (232) has a first portion (216) adjacent the p-doped portion of the waveguide portion (106) and a second portion (214) adjacent the first portion (216). The first portion (216) has substantially constant thickness, whereas the second portion (214) has a thickness that increases substantially linearly with the distance from the waveguide portion (106). Similarly, and in this example symmetrically, the n-side slab (234) has a first portion (226) adjacent the n-doped portion of the waveguide portion (106) and a second portion (224) adjacent the first portion (226). The first portion (226) has substantially constant thickness, whereas the second portion (224) has a thickness that increases substantially linearly with the distance from the waveguide portion (106). Although the profiles of the surfaces of the slab portions (232, 234) are piecewise linear in this example, other profiles of slabs of varying thickness can be used. Examples include linear throughout, curved and stepped.

Each of the contact portions (236, 238) has varying thickness above the insulation layer (104), i.e., in they direction in some embodiments. In the embodiment shown in FIG. 2, the p-side contact portion (236) has a first portion (212) adjacent the p-side slab (232) and a second portion (210) adjacent the first portion (212). The first portion (212) has a thickness that increases substantially linearly with the distance from the waveguide portion (106), whereas the second portion (210) has a substantially constant thickness. Similarly, and in this example symmetrically, the n-side contact portion (238) has a first portion (222) adjacent the n-side slab (234) and a second portion (220) adjacent the first portion (222). Although the profiles of the surfaces of the contact portions (236, 238) are piecewise linear in this example, other profiles can be used. Examples include flat (i.e., constant thickness) linear throughout, curved and stepped.

Together, the cross-sectional profiles of the waveguide portion (106), slabs (232, 243) and contact portions (236, 238) define the cross-sectional profiles of the channels (240, 250). In this example, the cross-sectional profiles of the channels (240, 250) are trapezoidal, but other shapes, such as triangular or curved, can be defined.

Figure 3:
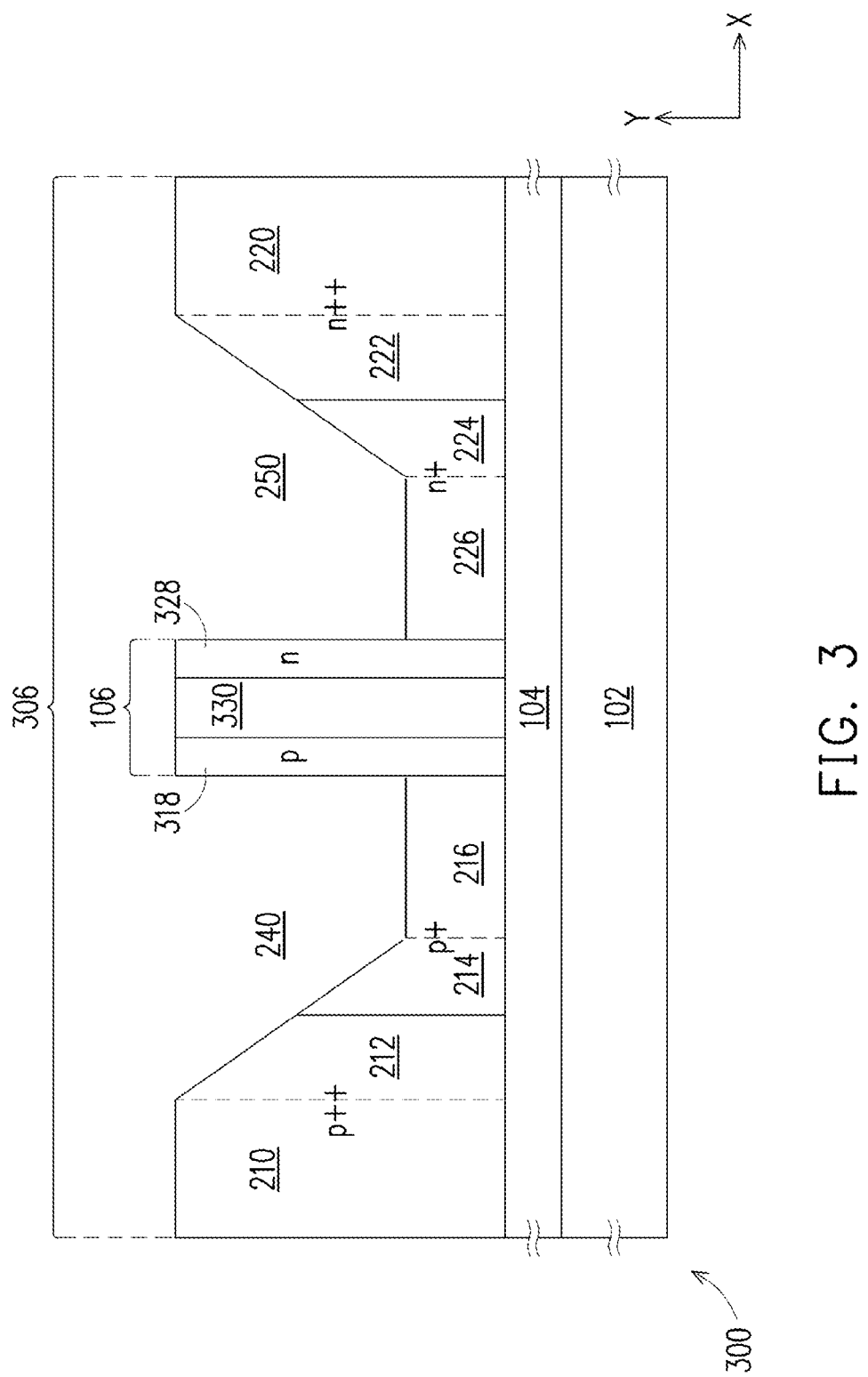
FIG. 3 is a cross-sectional view of another waveguide structure, in accordance with some embodiments.

In some embodiments, such as the one illustrated in FIG. 3, a p-i-n junction, can be constructed to form the waveguide portion (106). In this example, the waveguide portion (106) is a part of a semiconductor waveguide layer (306) disposed on top of the insulation layer (104) and includes a p-doped portion (318), an n-doped portion (328), and an un-doped (intrinsic) portion (330) between the p-doped portion (318) and n-doped portion (328), thereby forming a p-i-n junction between the interfaces between the un-doped portion (330) and the doped portions (318, 328), respectively. The interfaces are substantially parallel to a y-z plane. The waveguide structure in this example is otherwise substantially the same as the one illustrated in FIG. 2.

Figure 4:
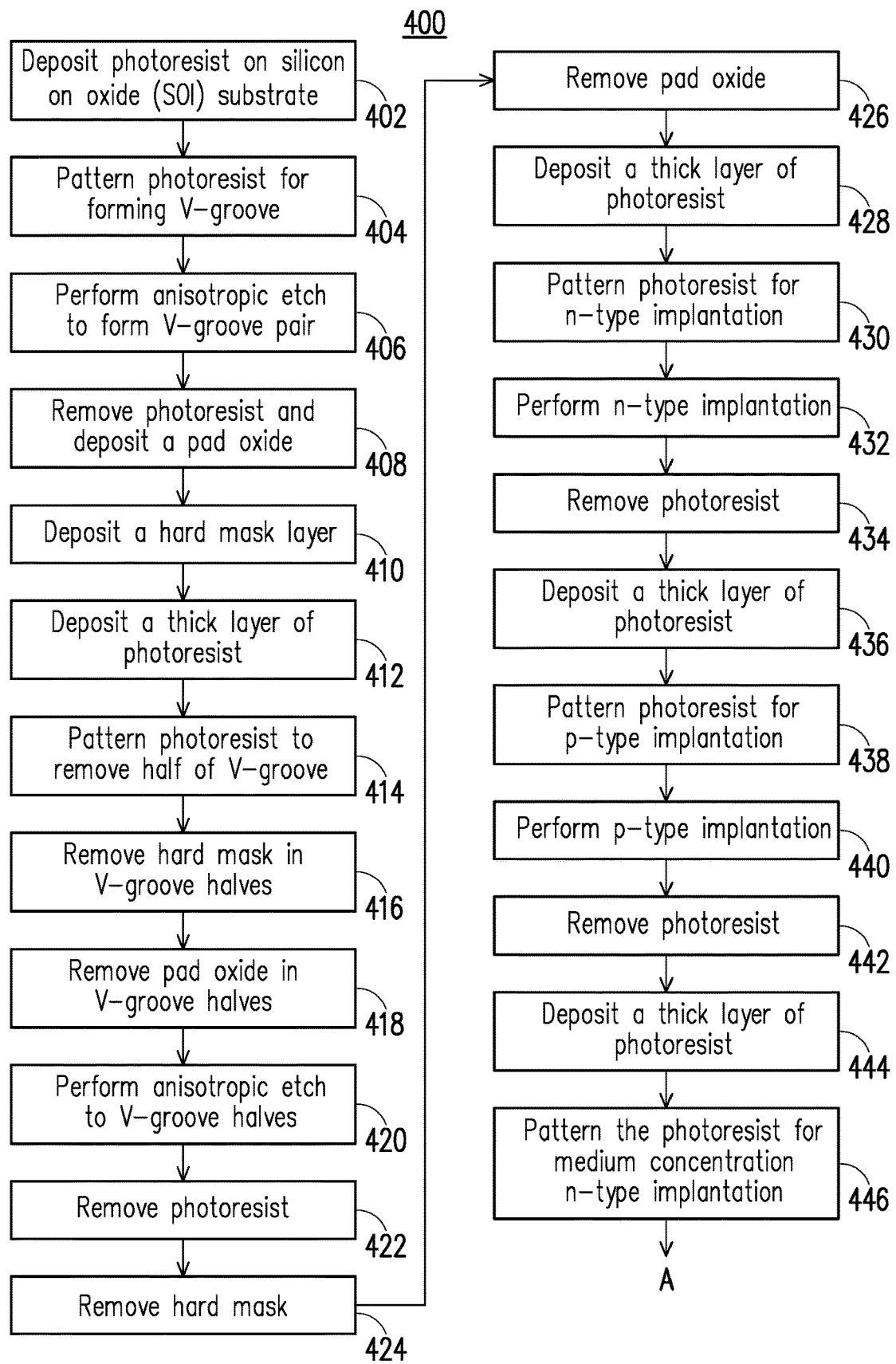
FIG. 4 is a flowchart of a method for making a waveguide structure, in accordance with some embodiments.
Figure 5:
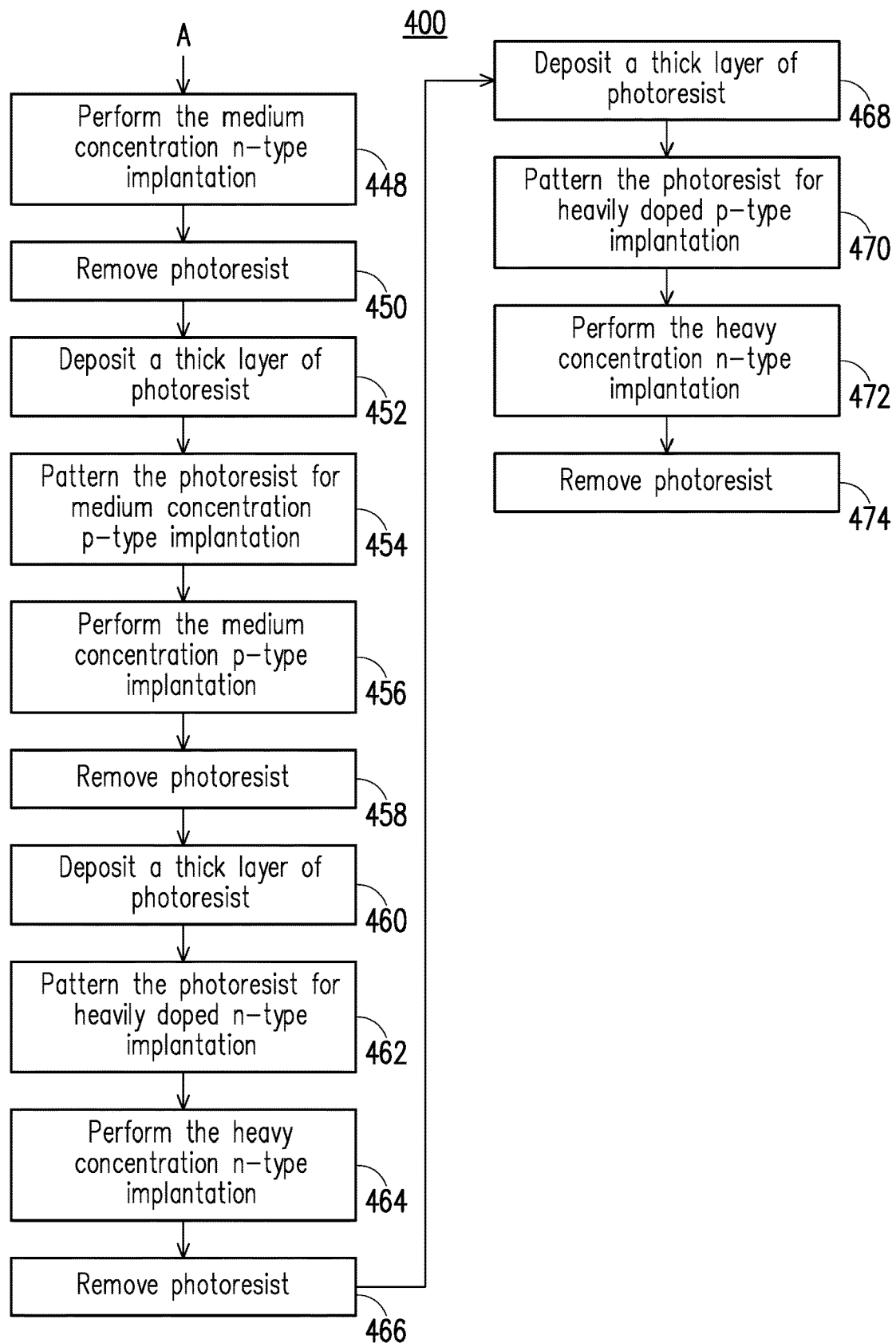
FIG. 5 is a continuation of the flowchart of the method for making a waveguide structure, in accordance with some embodiments.

In some embodiments, a semiconductor waveguide structure can be made by a process outlined in FIGS. 4 and 5 and illustrated in FIGS. 6-17, or similar processes. For each step, such as photoresist deposition and removal, pad oxide deposition and removal, hard mask deposition and removal, silicon etching, including anisotropic etching, and silicon doping, any suitable process, such as well-known semiconductor fabrication processes, can be used.

Figure 6A:
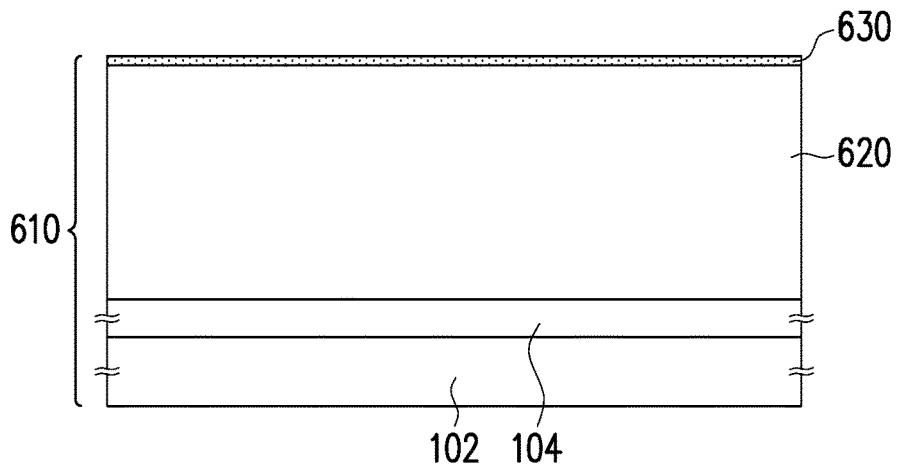
FIGS. 6A-C are cross-sectional views of a partially-formed waveguide structure at process steps 402, 404 and 406, respectively, outlined in FIGS. 4 and 5, in accordance with some embodiments.
Figure 6B:
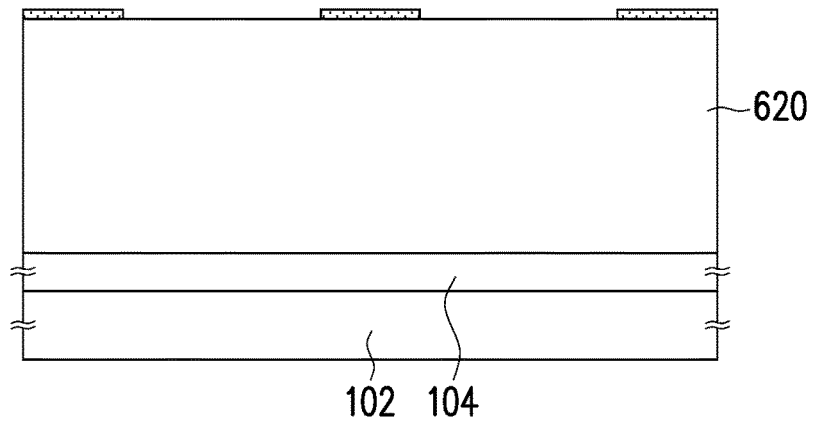
Figure 6C:
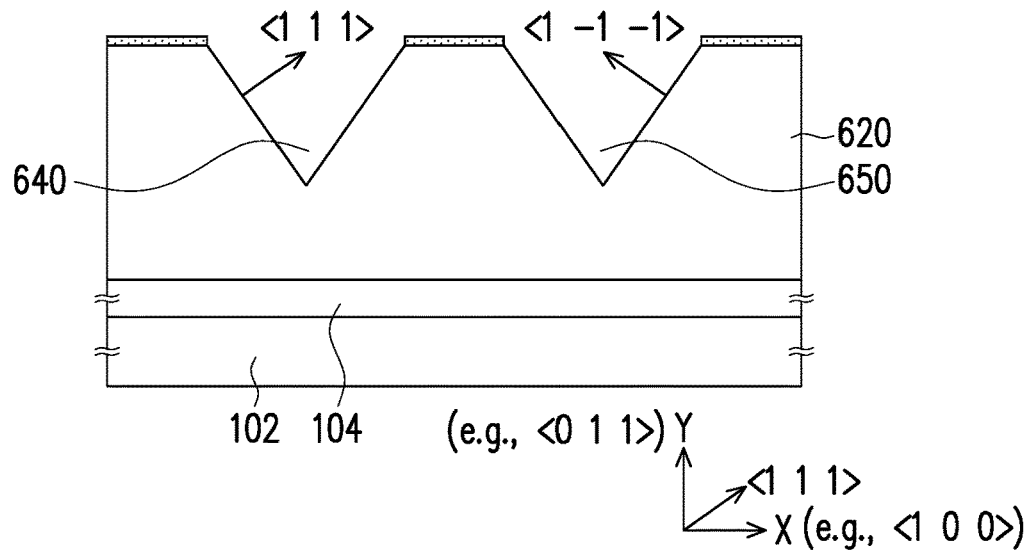
Figure 7A:
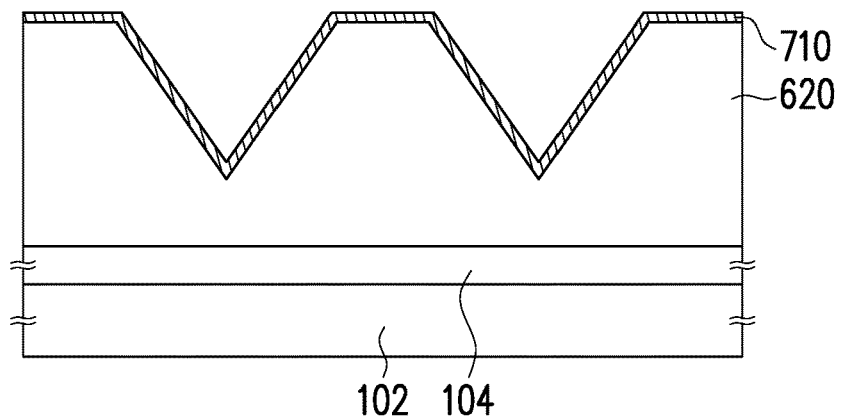
FIGS. 7A-C are cross-sectional views of a partially-formed waveguide structure at process steps 408, 410 and 412, respectively, outlined in FIGS. 4 and 5, in accordance with some embodiments.
Figure 7B:
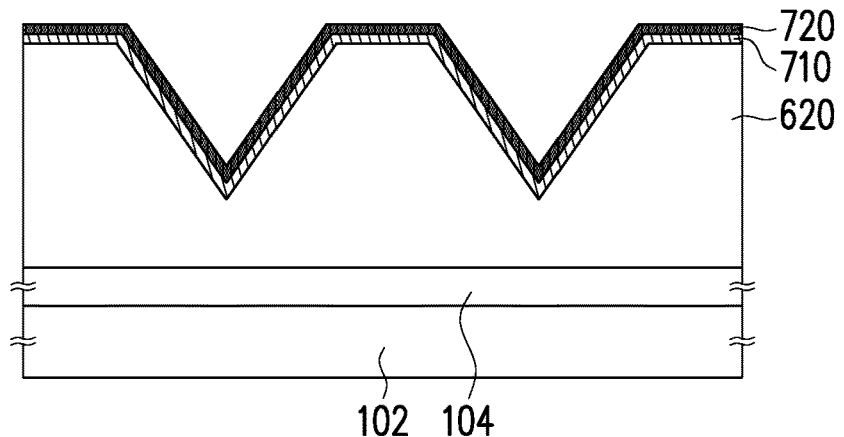
Figure 7C:
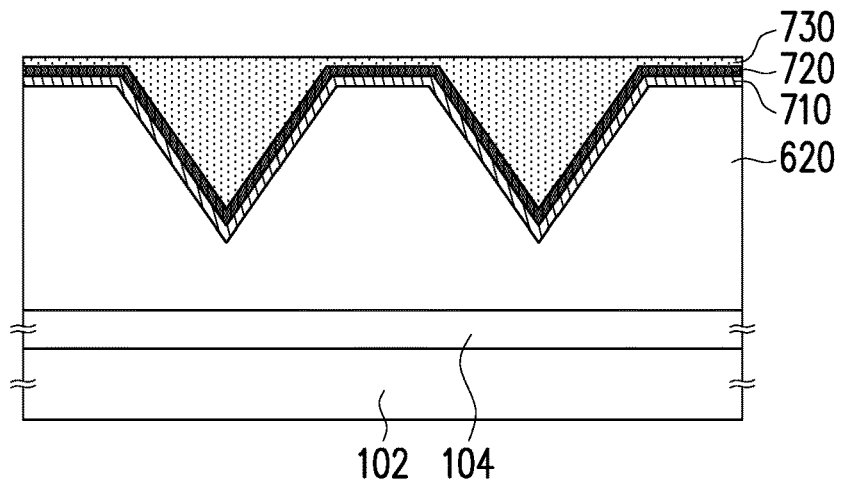
Figure 8A:
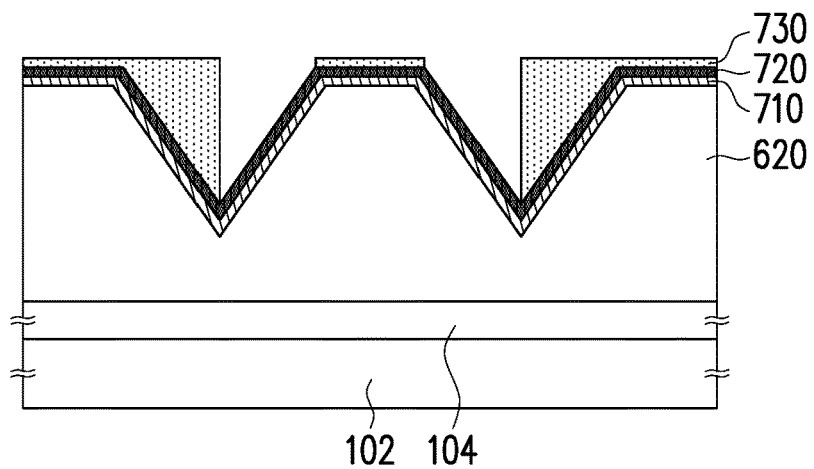
FIGS. 8A-C are cross-sectional views of a partially-formed waveguide structure at process steps 414, 416 and 418, respectively, outlined in FIGS. 4 and 5, in accordance with some embodiments.
Figure 8B:
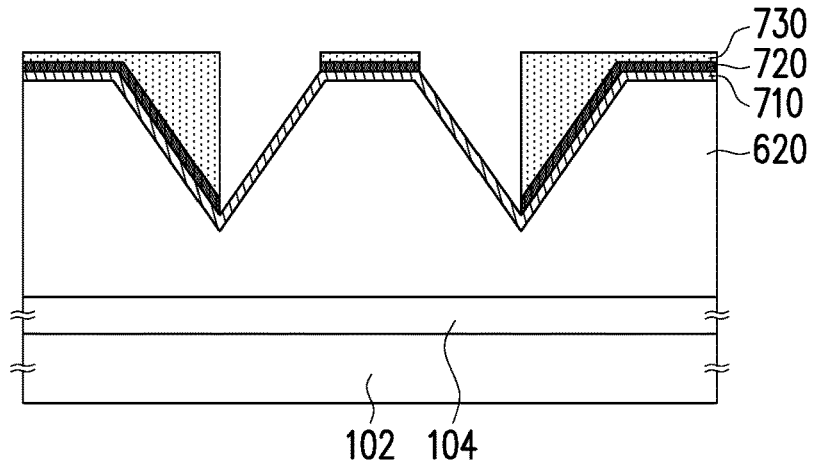
Figure 8C:
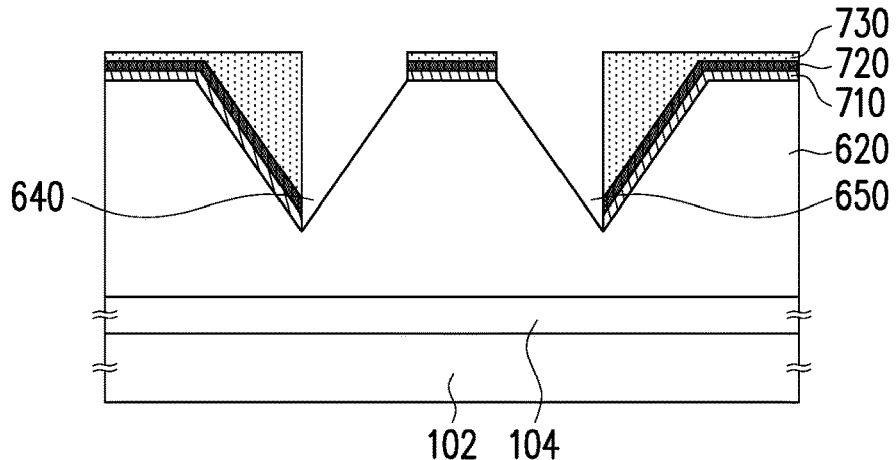
Figure 9A:
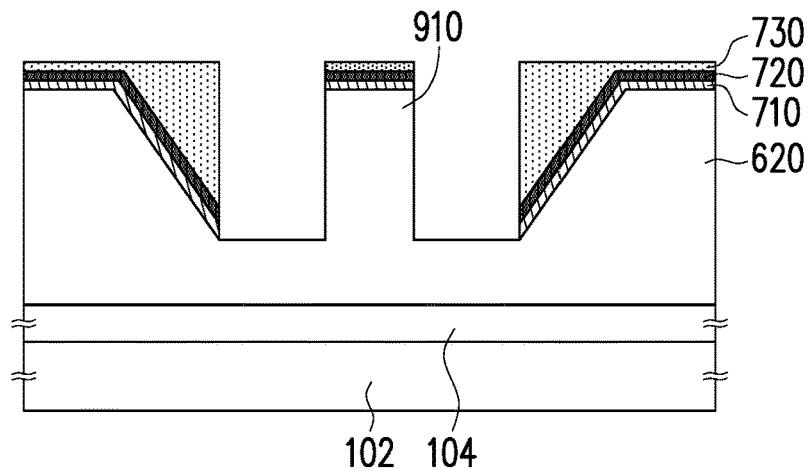
FIGS. 9A-C are cross-sectional views of a partially-formed waveguide structure at process steps 420, 422 and 424, respectively, outlined in FIGS. 4 and 5, in accordance with some embodiments.
Figure 9B:
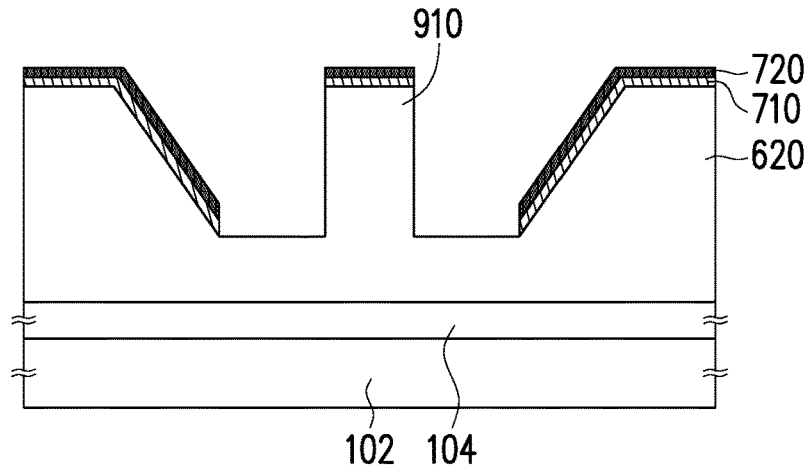
Figure 9C:
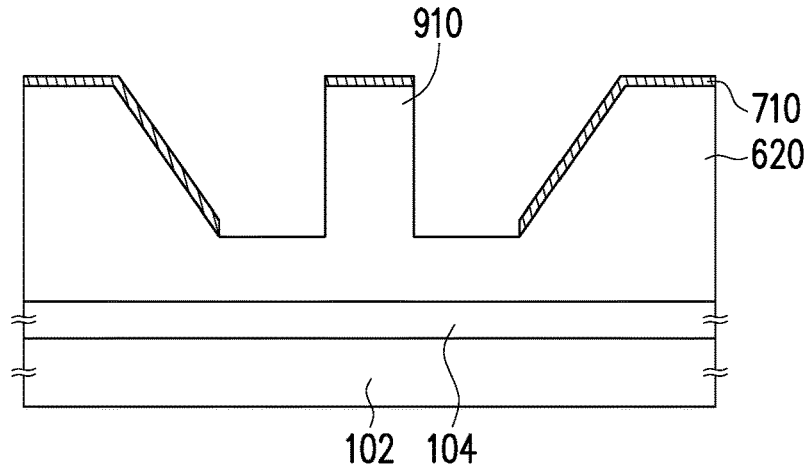
Figure 10A:
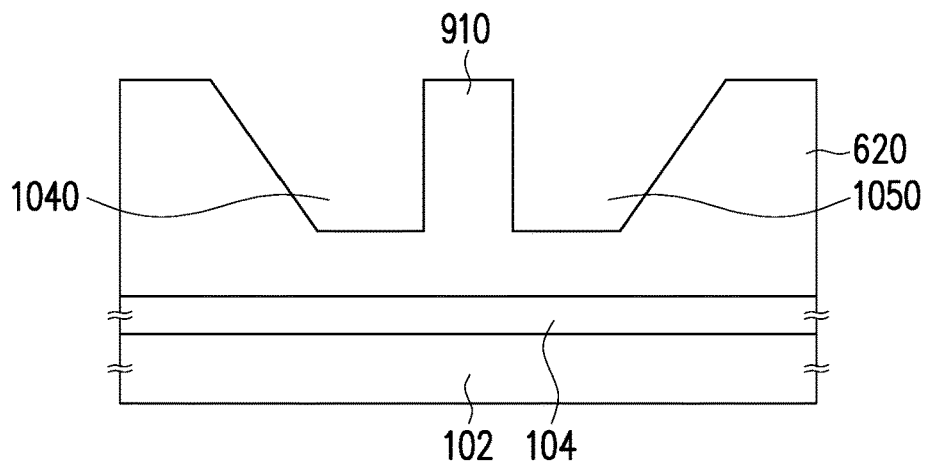
FIGS. 10A-C are cross-sectional views of a partially-formed waveguide structure at process steps, 426, 428 and 430, respectively, outlined in FIGS. 4 and 5, in accordance with some embodiments.
Figure 10B:
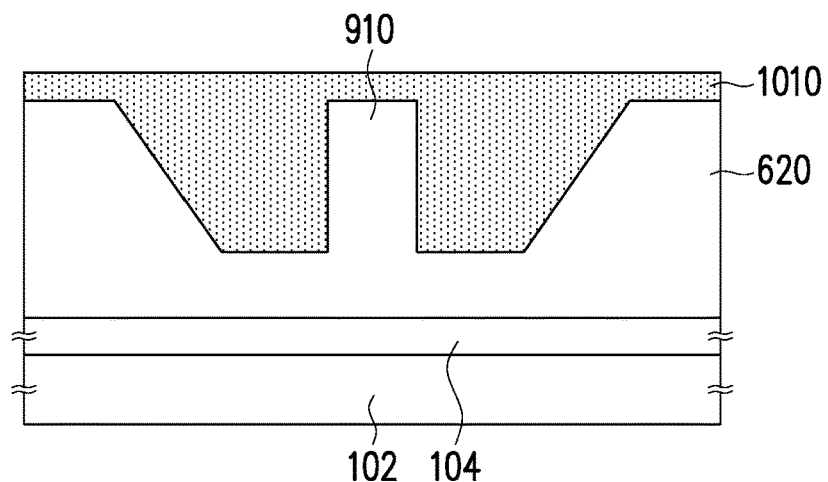
Figure 10C:
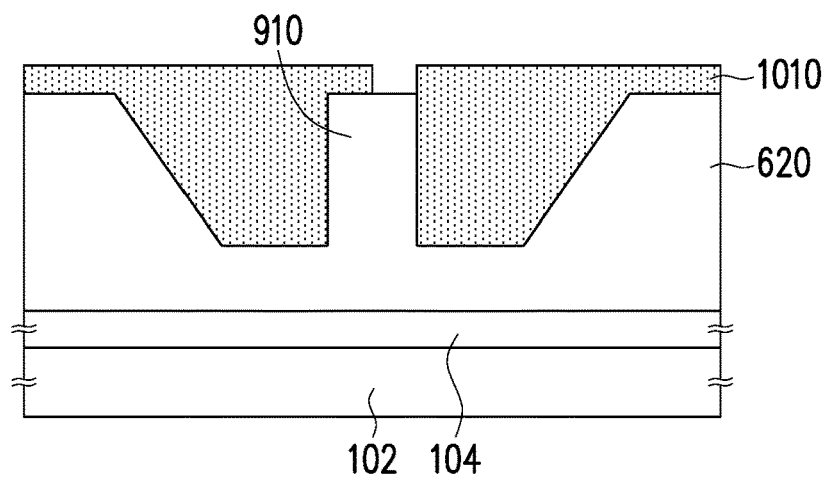
Figure 11A:
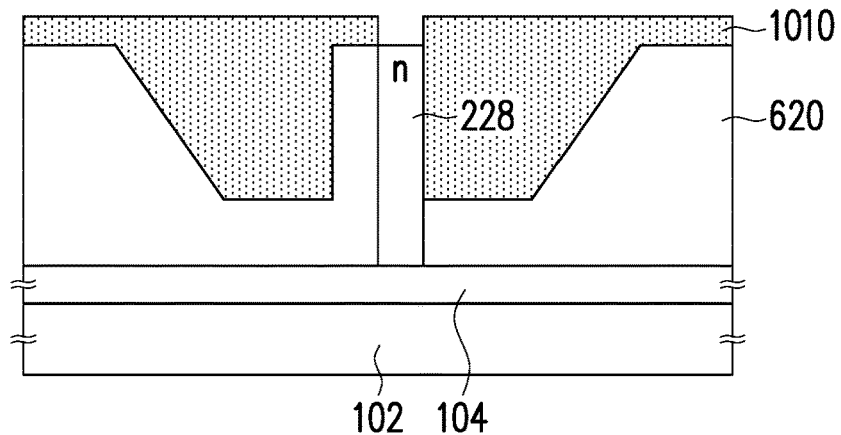
FIGS. 11A-C are cross-sectional views of a partially-formed waveguide structure at process steps 432, 434 and 436, respectively, outlined in FIGS. 4 and 5, in accordance with some embodiments.
Figure 11B:
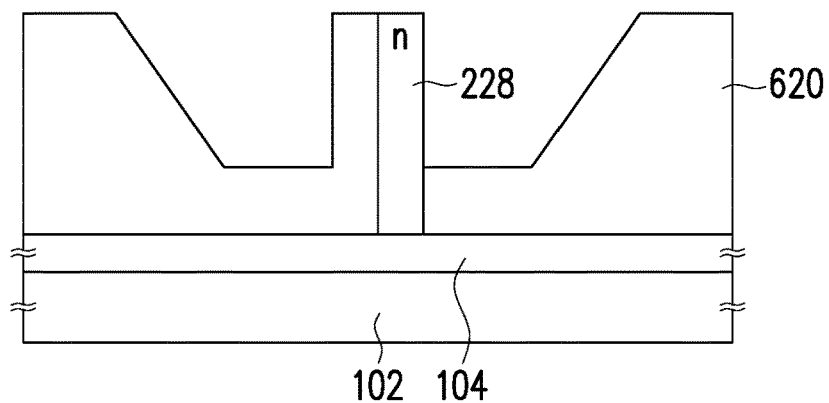
Figure 11C:
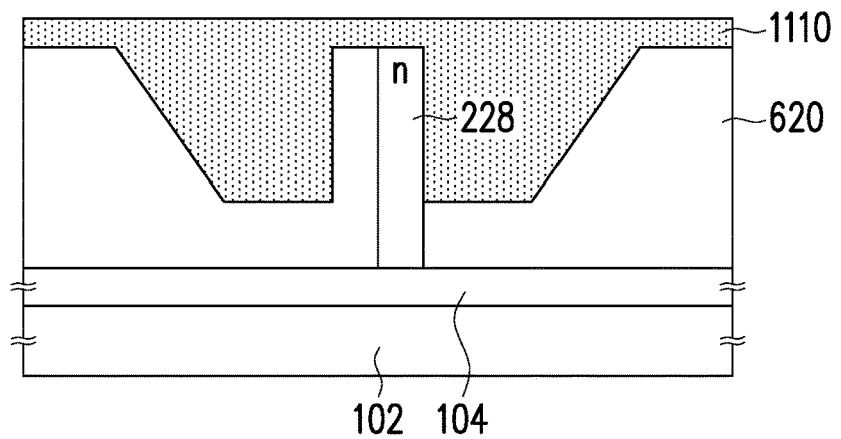
Figure 12A:
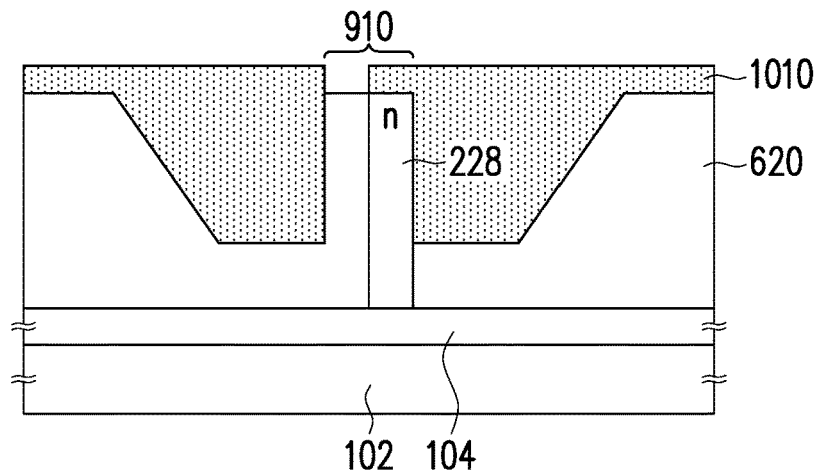
FIGS. 12A-C are cross-sectional views of a partially-formed waveguide structure at process steps 438, 440 and 442, respectively, outlined in FIGS. 4 and 5, in accordance with some embodiments.
Figure 12B:
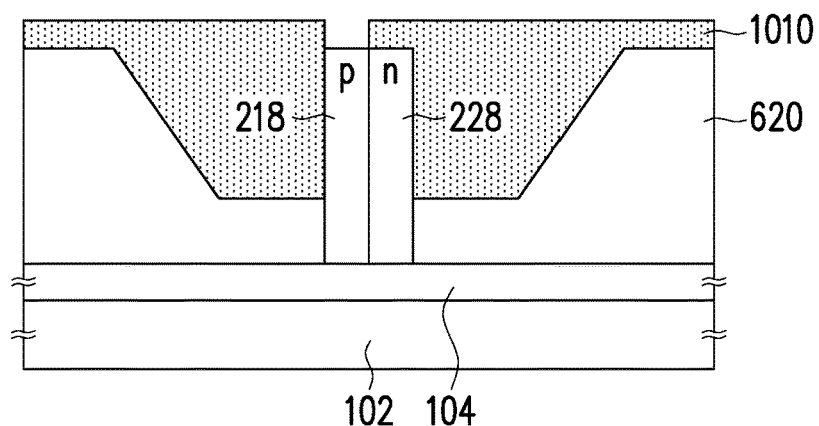
Figure 12C:
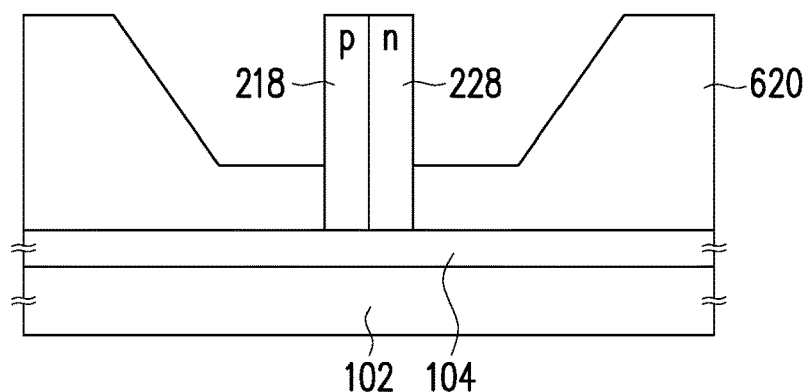
Figure 13A:
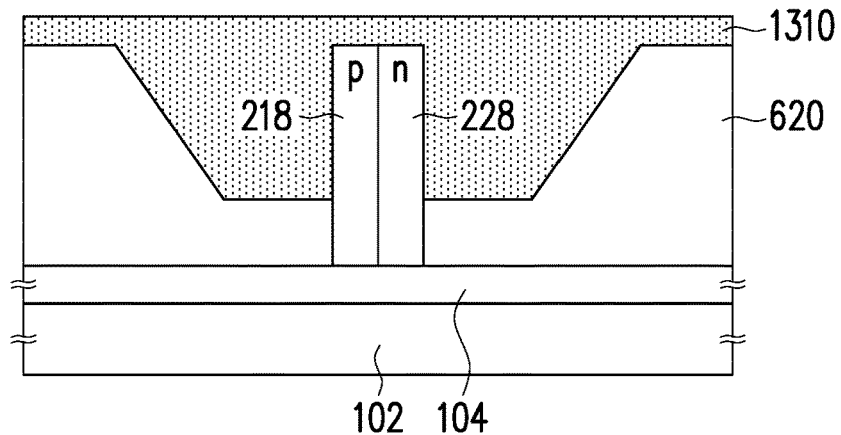
FIGS. 13A-C are cross-sectional views of a partially-formed waveguide structure at process steps 444, 446 and 448, respectively, outlined in FIGS. 4 and 5, in accordance with some embodiments.
Figure 13B:
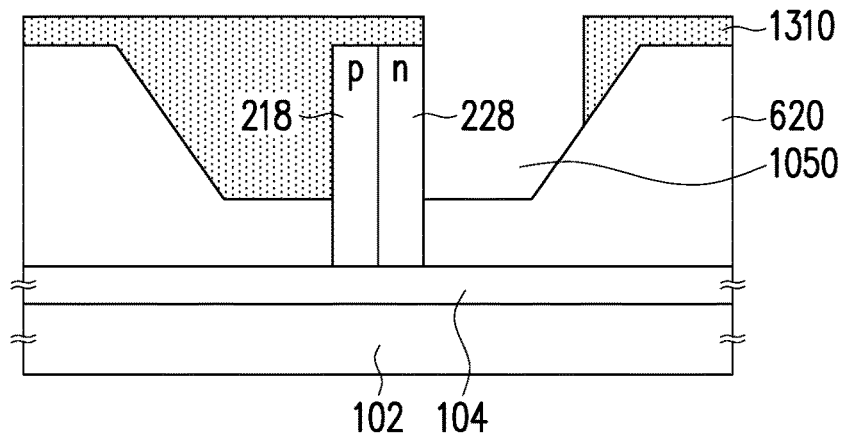
Figure 13C:
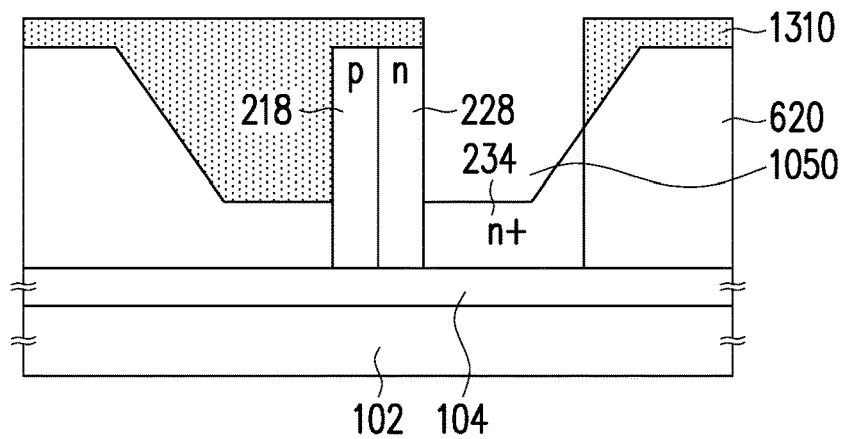
Figure 14A:
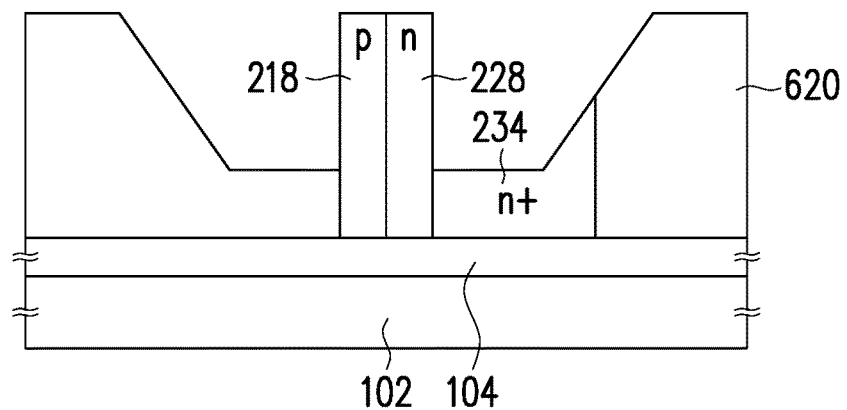
FIGS. 14A-C are cross-sectional views of a partially-formed waveguide structure at process steps 450, 452 and 454, respectively, outlined in FIGS. 4 and 5, in accordance with some embodiments.
Figure 14B:
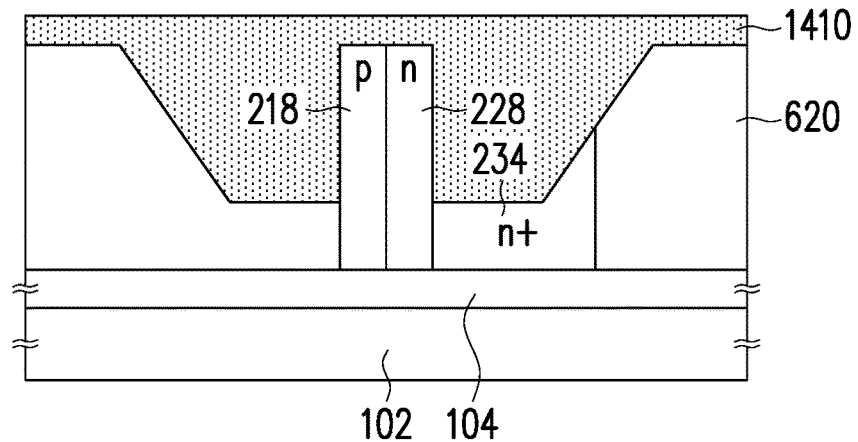
Figure 14C:
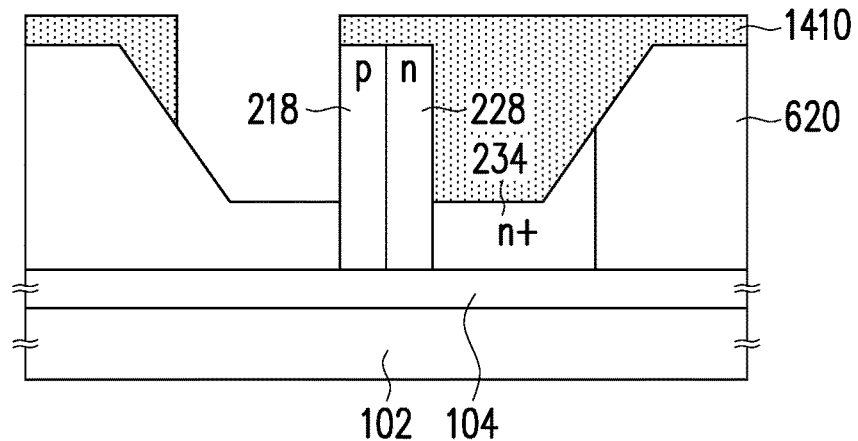
Figure 15A:
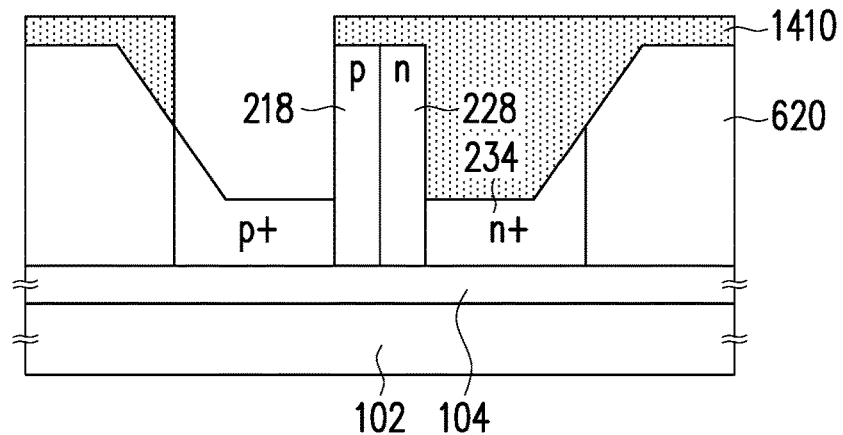
FIGS. 15A-C are cross-sectional views of a partially-formed waveguide structure at process steps 456, 458 and 460, respectively, outlined in FIGS. 4 and 5, in accordance with some embodiments.
Figure 15B:
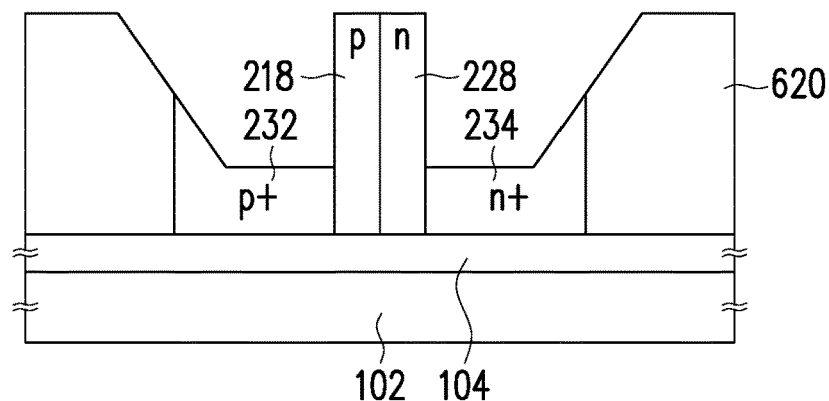
Figure 15C:
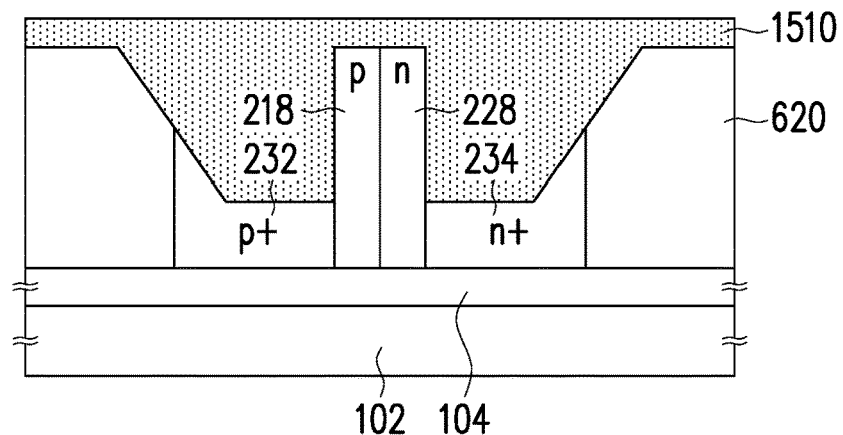
Figure 16A:
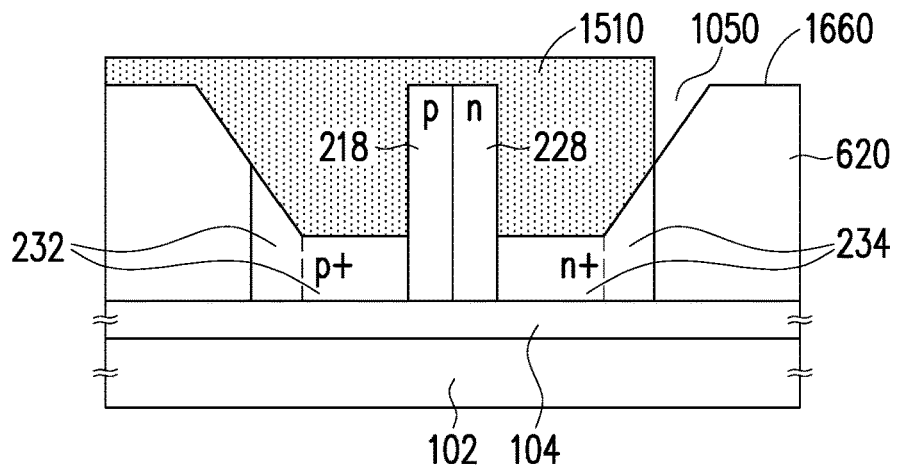
FIGS. 16A-C are cross-sectional views of a partially-formed waveguide structure at process steps 462, 464 and 466, respectively, outlined in FIGS. 4 and 5, in accordance with some embodiments.
Figure 16B:
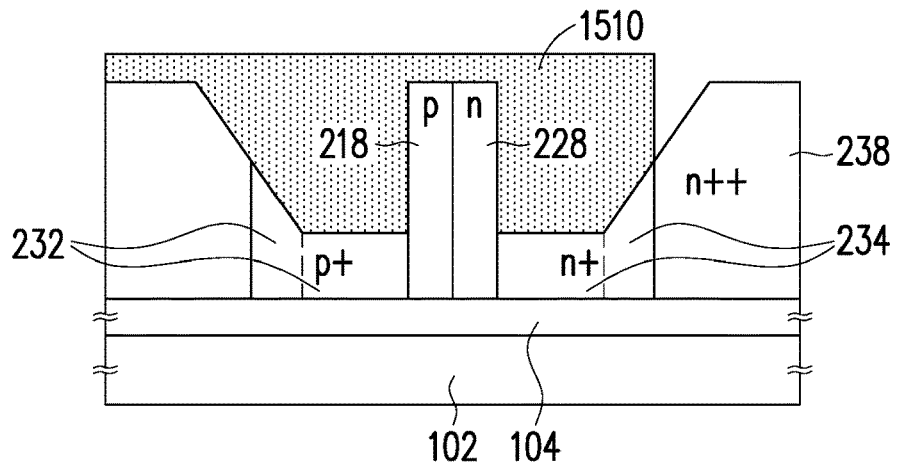
Figure 16C:
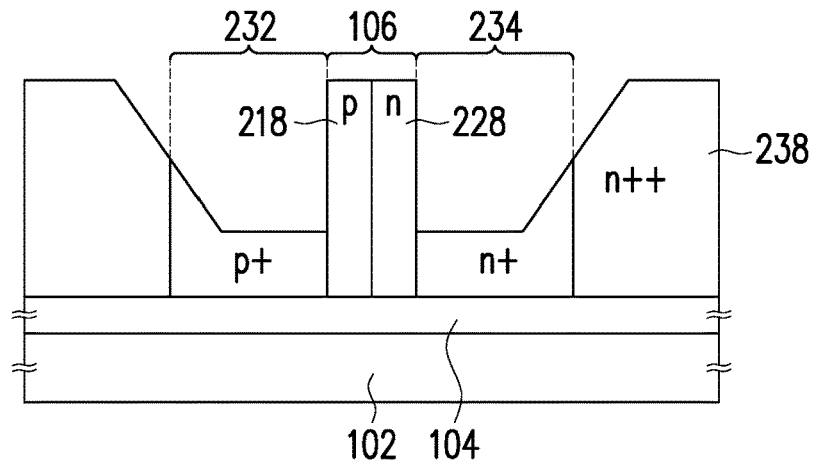
Figure 17A:
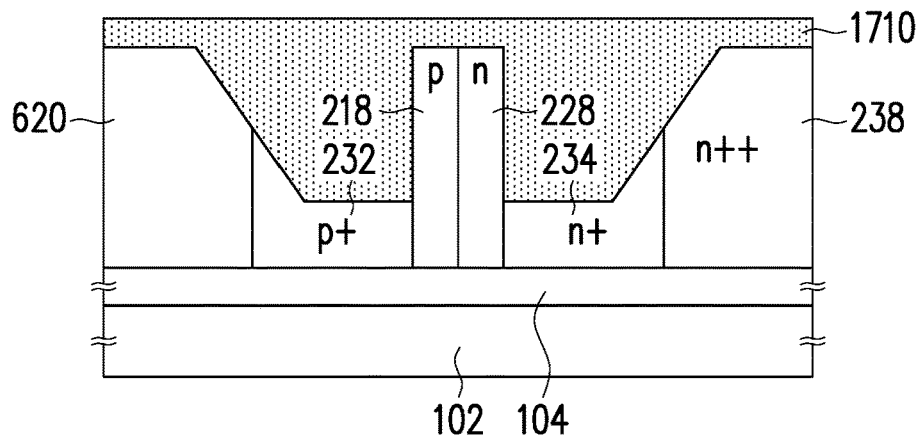
FIGS. 17A-C are cross-sectional views of a partially-formed waveguide structure at process steps 468, 470 and 472, respectively, outlined in FIGS. 4 and 5, in accordance with some embodiments.
Figure 17B:
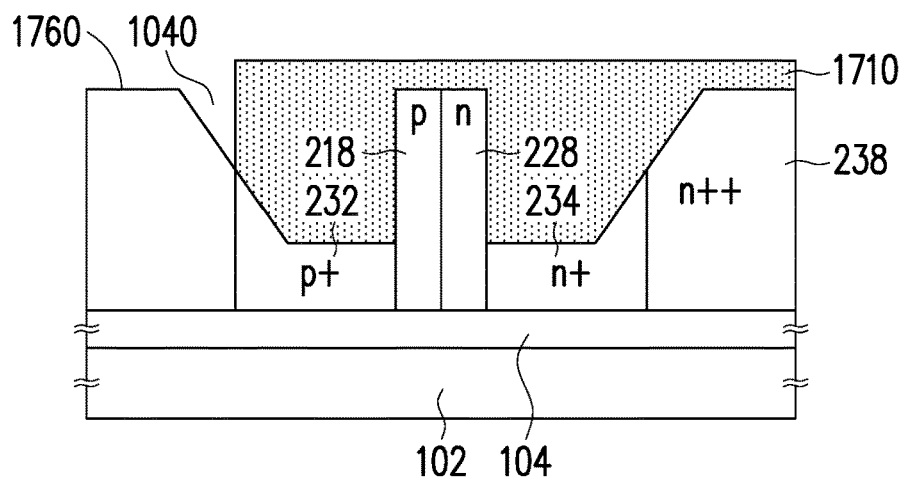
Figure 17C:
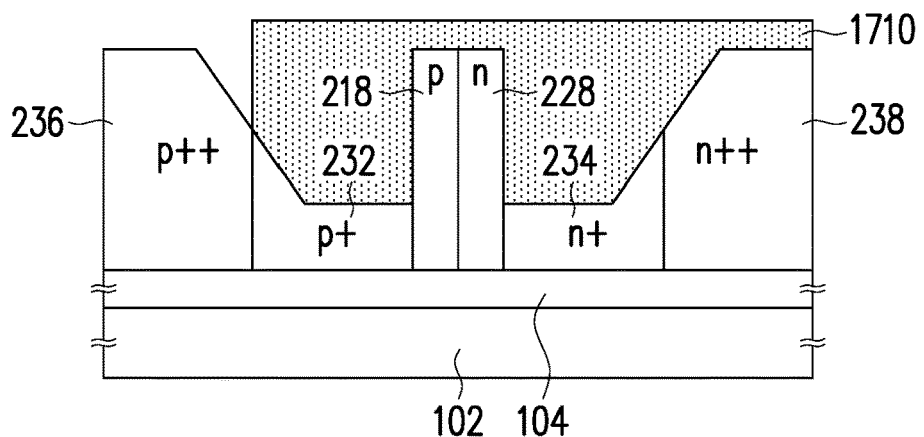

First (402 and FIG. 6A), a photoresist layer (630) is deposited on a silicon-on-oxide (SOI) substrate (610), which includes a silicon substrate (102), an oxide (e.g., BOX) insulating layer (104) on top of the silicon substrate (102), and a top silicon layer (620). Next (404 and FIG. 6B), the photoresist (630) is patterned to expose the portions of the silicon layer (620) to be etched to form channels (or grooves). Next (406 and FIG. 6C), etching, such as anisotropic etching, is performed to form a pair of grooves (640, 650) of sloped surfaces, i.e., grooves with a V-shaped cross-sectional profile. For example, as shown in FIG. 6C, grooves with surfaces of <1 1 1> and <1 −1 −1> orientations can be formed by anisotropic etching of silicon surface of <1 0 0> orientation.

Next (408 and FIG. 7A), the photoresist layer (630) is removed and a pad oxide (or buffer oxide) layer (710) is deposited over the etched silicon surface in preparation for subsequent deposition of a hard mask layer. The pad oxide layer (710) serves the purpose of reducing stress in the mask layer due to the mismatch between the crystal structures of silicon and that of the hard mask. Next (410 and FIG. 7B), a hard mask (720), such as a SiN mask, is deposited over the pad oxide layer (710). Next (412 and FIG. 7C), a thick layer of photoresist (730) is deposited over the hard mask (720). Next (414 and FIG. 8A), the photoresist layer (730) is patterned for exposing the hard mask (720) covering the half each V-shaped grooves (640, 650) that is closer to the other groove. Next (416 and FIG. 8B), the exposed hard mask is removed to expose the underlying pad oxide. Next (418 and FIG. 8C), the exposed pad oxide is removed to exposed the underlying silicon layer (620). Next (420 and FIG. 9A), anisotropic etching is performed to remove portions of the silicon layer (620) to form substantially vertical (i.e., x- or minus x-oriented) side surfaces of the silicon portion (910) separating the grooves (640, 650). Next (422 and FIG. 9B, 424 and FIG. 9C, and 426 and FIG. 10A, respectively), the thick photoresist (730), hard mask (720) and pad oxide (710) layers are sequentially removed, exposing the entire surface of the top silicon layer (620), including the surfaces of the now trapezoidal-profiled channels (1040, 1050). The silicon portion (910) separating the grooves (1040, 1050) is now a ribbed silicon portion.

Next (428 and FIG. 10B), a thick photoresist layer (1010) is deposited over the entire surface of the top silicon layer (620). Next (430 and FIG. 10C), the photoresist layer (1010) is patterned to expose half of the ribbed silicon portion (910). Next (432 and FIG. 11A), n-type implantation is performed to dope the exposed half of the ribbed silicon portion (910) with an n-type dopant. An n-doped portion (228) is thus formed. Next (434 and FIG. 11B, 436 and FIG. 11C, and 438 and FIG. 12A respectively), the thick photoresist (1010) is removed, a new thick photoresist (1110) is deposited over the entire surface, and the photoresist (1110) is patterned to expose the other half of the ribbed silicon portion (910). Next (440 and FIG. 12B), p-type implantation is performed to dope the exposed half of the ribbed silicon portion (910) with a p-type dopant. A p-doped portion (218) is thus formed. Next (442 and FIG. 12C), the photoresist layer (1110) is removed.

Next (444 and FIG. 13A, 446 and FIG. 13B, 448 and FIG. 13C, and 450 and FIG. 14A, respectively), a thick photoresist layer (1310) is deposited over the entire surface of the top silicon layer (620) and patterned to expose a portion of the surface of the channel (1050) adjacent the n-doped portion of the ribbed silicon portion (910), n-type implantation is performed to dope the exposed top silicon portion (620) with an n-type dopant to a higher concentration level than in the n-doped waveguide portion (228), and the thick photoresist (1310) is subsequently removed. An n-side slab portion (234) is thus formed.

Next (452 and FIG. 14B, 454 and FIG. 14C, 456 and FIG. 15A, and 458 and FIG. 15B, respectively), a thick photoresist layer (1410) is deposited over the entire surface of the top silicon layer (620) and patterned to expose a portion of the surface of the channel (1040) adjacent the p-doped portion of the ribbed silicon portion (910), p-type implantation is performed to dope the exposed top silicon portion (620) with a p-type dopant to a higher concentration level than in the p-doped waveguide portion (218), and the thick photoresist (1410) is subsequently removed. A p-side slab portion (232) is thus formed.

Next (460 and FIG. 15C, 462 and FIG. 16A, 464 and FIG. 16B, and 466 and FIG. 16C, respectively), a thick photoresist layer (1510) is deposited over the entire surface of the top silicon layer (620) and patterned to expose a portion of the surface of the channel (1050) adjacent the surface of the n-side slab (234) as well as adjacent top surface (1660) of the top silicon layer (620), n-type implantation is performed to dope the exposed top silicon portion (620) with an n-type dopant to a higher concentration level than in the n-side slab (234), and the thick photoresist (1510) is subsequently removed. An n-side contact portion (238) is thus formed.

Next (468 and FIG. 17A, 470 and FIG. 17B, 472 and FIG. 17C, and 474 and FIG. 2, respectively), a thick photoresist layer (1710) is deposited over the entire surface of the top silicon layer (620) and patterned to expose a portion of the surface of the channel (1040) adjacent the surface of the p-side slab (232) as well as adjacent top surface (1760) of the top silicon layer (620), p-type implantation is performed to dope the exposed top silicon portion (620) with a p-type dopant to a higher concentration level than in the p-side slab (232), and the thick photoresist (1710) is subsequently removed. A p-side contact portion (236) is thus formed, and the making of the waveguide structure shown in FIG. 2 is complete.

A similar process can be carried out to make the waveguide structure shown in FIG. 3. The difference is that in the step (430 and FIG. 10C) of patterning the photoresist (1010) to expose the ribbed silicon portion (910) for n-type doping and the step (438 and FIG. 12A) of patterning the photoresist (1110) to expose the ribbed silicon portion (910) for p-type doping, the width of the combined openings in photoresist (1010, 1110) is less than the width w of the ribbed silicon portion (910) so that a portion of the ribbed silicon portion (910) receives neither n-type doping nor p-type doping, thereby remaining un-doped.

Disclosed examples thus provide a semiconductor waveguide structure suitable for phase-shifting operations with improved bandwidth and/or speed by providing an improved combination of reduced contact resistance and reduced transmission loss over traditional optical phase shifters. A consequence of the improvement is that smaller bending radii in phase shifters can be achieved, thereby enabling the design and fabrication of phase-shifting devices, such as serpentine-shaped phase shifters, requiring such bending radii. The disclosed examples employs readily available methods, such as well-known semiconductor manufacturing processes, including conventional CMOS manufacturing processes, and therefore can be readily practiced.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A phase-shifting device, comprising:
    an insulating layer; and
    a semiconductor waveguide layer disposed on the insulating layer and comprising:
        a waveguide portion having a p-n junction or p-i-n junction, the p-n junction or p-i-n junction comprising a p-doped portion and an n-doped portion disposed relative to each other along a first direction, the p-doped portion and n-doped portion each having an area with a first dimension along a second direction substantially parallel to the insulating layer and perpendicular to the first direction, and a second dimension along a third direction substantially perpendicular to the insulating layer and the first direction; and
        a pair of slab portions, each adjacent to, and extending from, a corresponding one of the p-doped and n-doped portions in the first direction and having a cross-sectional area substantially parallel to the area of the corresponding one of the p-doped and n-doped portions, the cross-sectional area varying in size with distance from the corresponding one of the p-doped and n-doped portions along the first direction, the slab portion adjacent the p-doped portion of the p-n or p-i-n junction being p-doped having a p-dopant concentration higher than that of the p-doped portion, and the slab portion adjacent the n-doped portion of the p-n or p-i-n junction being n-doped and having an n-dopant concentration higher than that of the n-doped portion,
        each of the pair of the slab portions having a top surface opposite the insulating layer from across the slab portion, the top surface comprising a sloped planar portion oriented at an oblique angle relative to the insulating layer and formed by anisotropic etching along a crystallographic plane.

2. The phase-shifting device of claim 1, wherein the semiconductor waveguide layer further comprises a pair of contact portions, each adjacent to, on an opposite side from the waveguide portion of, and extending from, a corresponding one of the pair of slab portions in the first direction, the contact portion adjacent the p-doped slab portion being p-doped and having a p-dopant concentration higher than that of the p-doped slab portion, and the contact portion adjacent the n-doped slab portion being n-doped and having an n-dopant concentration higher than that of the n-doped slab portion.

3. The phase-shifting device of claim 2, wherein each of the pair of contact portions has:
    a cross-sectional area substantially parallel to the area of the corresponding one of the p-doped and n-doped portions, the cross-sectional area varying in size with distance from the corresponding one of the p-doped and n-doped portions along the first direction, and
    a top surface opposite the insulating layer from across the slab portion, the top surface comprising a sloped planar portion oriented at an oblique angle relative to the insulating layer and formed by anisotropic etching.

4. The phase-shifting device of claim 3, wherein the sloped planar portions of the respective top surfaces of the slab portion and contact portion on each side of the waveguide portion are coplanar with each other.

5. The phase-shifting device of claim 3, wherein the waveguide portion, the slab portions and the contact portions are each a portion of a common single-crystal semiconductor.

6. The phase-shifting device of claim 5 wherein the insulating layer comprises a buried oxide layer formed from the common single-crystal semiconductor.

7. The phase-shifting device of claim 5, wherein the single-crystal semiconductor is single-crystal silicon, and the sloped planar portions of the top surfaces of the slab portions and contact portions are <1 1 1> silicon crystallographic planes.

8. The phase-shifting device of claim 5, wherein the waveguide portion is disposed on the insulating layer and extending in the second direction and has a height from the insulating layer, wherein each of the slab portions is disposed on the insulating layer and has a height from the insulating layer, the p-doped portion of the waveguide portion has a first surface portion oriented in the first direction, and the n-doped portion of the waveguide portion has a second surface portion oriented in the opposite direction from the first surface portion, the first and second surface portions each being a <1 0 0> silicon crystallographic plane.

9. The phase-shifting device of claim 2, wherein the waveguide portion, slab portions and contact portions are disposed on the insulation layer, wherein:
the cross-sectional area of each of the slab portions has a height substantially in the third direction, the height increasing with distance from the waveguide portion, and
each of the pair of contact portions has a cross-sectional area substantially parallel to the area of the corresponding one of the p-doped and n-doped portions, the cross-sectional area having a height substantially in the third direction, the height increasing with distance from the waveguide portion.

10. The phase-shifting device of claim 1, wherein the waveguide portion and slab portions are disposed on the insulation layer, wherein the cross-sectional area of each of the slab portions has a height substantially in the third direction, the height increasing with distance from the waveguide portion.

11. The phase-shifting device of claim 1, wherein the waveguide portion is disposed on the insulating layer and extending in the second direction and has a height from the insulating layer, wherein each of the slab portions is disposed on the insulating layer and has a height from the insulating layer, the p-doped portion of the waveguide portion has a first surface portion oriented in the first direction, and the n-doped portion of the waveguide portion has a second surface portion oriented in the opposite direction from the first surface portion, the first and second surface portions each being formed by anisotropic etching.

12. The phase-shifting device of claim 11, wherein each of the slab portions has a width in the first direction, the height of each slab portion being smaller than the height of the waveguide at a location adjacent the waveguide portion.

13. A phase-shifting device, comprising:
a planar insulating layer oriented in a first direction; and
a semiconductor waveguide layer, comprising:
a waveguide portion having a ribbed structure extending in a longitudinal direction substantially perpendicular to the first direction and comprising a p-n junction or p-i-n junction, the p-n junction or p-i-n junction comprising a planar p-doped and planar n-doped portions disposed on the insulating layer and disposed relative to each other along a second direction, the p-doped portion and n-doped portion each having a height in the first direction;
a pair of slab portions, each disposed on the insulating layer and adjacent to, and extending from, a corresponding one of the p-doped and n-doped portions in the second direction, having the width in the second direction and having a height in the first direction, the height varying with distance from the waveguide portion, the slab portion adjacent the p-doped portion of the p-n or p-i-n junction being p-doped having a p-dopant concentration higher than that of the p-doped portion, and the slab portion adjacent the n-doped portion of the p-n or p-i-n junction being n-doped and having an n-dopant concentration higher than that of the n-doped portion, each of the pair of the slab portions having a top surface opposite the insulating layer from across the slab portion, the top surface comprising a sloped planar portion oriented at an oblique angle relative to the insulating layer and formed by anisotropic etching along a crystallographic plane; and
a pair of contact portions, each disposed on the insulating layer and adjacent to, and extending from, a corresponding one of the pair of slab portions away from the waveguide portion in the second direction, the contact portion adjacent the p-doped slab portion being p-doped and having a p-dopant concentration higher than that of the p-doped slab portion, and the contact portion adjacent the n-doped slab portion being n-doped and having an n-dopant concentration higher than that of the n-doped slab portion.

14. The phase-shifting device of claim 13, wherein at least a portion of the waveguide portion and at least a portion of each slab portion define a channel extending substantially in the longitudinal direction, the channel having a depth in the first direction, the depth to the top surface of the slab portion linearly increasing with distance from the waveguide portion.

15. The phase-shifting device of claim 14, wherein:
the sloped planar portions of the respective top surfaces of the slab portion and contact portion on each side of the waveguide portion are coplanar with each other, and
at least a portion of the waveguide portion, at least a portion of each of the slab portions and at least a portion of the one of the contact portions adjacent the slab portion define a channel extending substantially in the longitudinal direction, the channel having a depth in the first direction, the depth to the top surface of the slab portion increasing linearly with distance from the waveguide portion, and the depth to a top surface of the contact portion increasing linearly with distance from the waveguide portion.

16. The phase-shifting device of claim 14, wherein the waveguide portion, the slab portions and the contact portions are each formed in a common single-crystal semiconductor.

17. The phase-shifting device of claim 14, wherein each of the slab portions comprises a first slab portion of a substantially uniform thickness in the first direction and a second slab portion of a varying thickness in the first direction, wherein each of the contact portions comprises a first contact portion of a varying thickness in the first direction and a second contact portion of a substantially uniform thickness in the first direction, the second slab portion and the first contact portion forming a portion of the channel with a monotonically decreasing channel depth with distance from the waveguide portion.

18. A method of making a phase shifting device, the method comprising:
forming a pair of channels in a top surface of a single-crystal semiconductor substrate, the top surface defining a first direction substantially perpendicular to the top surface, the channels extending substantially parallel to each other and along a longitudinal direction parallel to the top surface, the channels being separated by an elongated portion of the substrate, the elongated portion extending substantially in the longitudinal direction and having a width in a second direction substantially perpendicular to the first and longitudinal directions, each of the channels having a depth varying with distance in the second direction from the elongated portion of the substrate, wherein the forming of each of the pair of channels comprises forming a sloped planar top surface portion of the single-crystal semiconductor by anisotropic etching along a crystallographic plane such that the sloped planar top surface portion is oriented at an oblique angle relative to the first direction;

forming a p-n or p-i-n junction in the elongated portion of the substrate by doping a portion of the elongated portion of the substrate with a p-type dopant and doping another portion of the elongated portion of the substrate with an n-type dopant, the portion doped with the p-type dopant being disposed relative to the portion doped with the n-type dopant in the second direction, the p-n or p-i-n junction lying substantially in a plane perpendicular to the second direction;

doping at least a first portion of the semiconductor substrate under a first one of the channels with a p-type dopant to a higher concentration than in the p-doped portion in the elongated portion of the substrate; and doping at least a first portion of the semiconductor substrate under a second one of the channels with an n-type dopant to a higher concentration than in the n-doped portion in the elongated portion of the substrate.

19. The method of claim 18, wherein forming each of the pair of channels further comprises anisotropic etching the semiconductor substrate to form a pair of surfaces of the elongated portion of the substrate, each of the surfaces oriented in a direction substantially parallel to the second direction.

20. The method of claim 18, further comprising:

doping at least a second portion of the semiconductor substrate under a first one of the channels with a p-type dopant to a higher concentration than in the first portion of the semiconductor substrate under a first one of the channels; and doping at least a second portion of the semiconductor substrate under a second one of the channels with an n-type dopant to a higher concentration than in the first portion of the semiconductor substrate under a second one of the channels.

* * * * *

UNITED STATES PATENT AND TRADEMARK OFFICE
CERTIFICATE OF CORRECTION

PATENT NO.         : 11,415,820 B2
APPLICATION NO.    : 16/865586
DATED              : August 16, 2022
INVENTOR(S)        : Chan-Hong Chern It is certified that error appears in the above-identified patent and that said Letters Patent is hereby corrected as shown below:

In the Specification

Column 7, Line 2:
"they" should read ---the y---

Signed and Sealed this
Fourth Day of October, 2022

*Katherine Kelly Vidal*

Katherine Kelly Vidal
*Director of the United States Patent and Trademark Office*